March 12, 1957  F. T. NEWELL ET AL  2,784,933
SERVICE T

Filed July 27, 1951  3 Sheets-Sheet 1

INVENTORS
FREDERICK T. NEWELL AND
BY THOMAS J. O'HARGAN

ATTORNEY

March 12, 1957     F. T. NEWELL ET AL     2,784,933
SERVICE T
Filed July 27, 1951     3 Sheets-Sheet 2
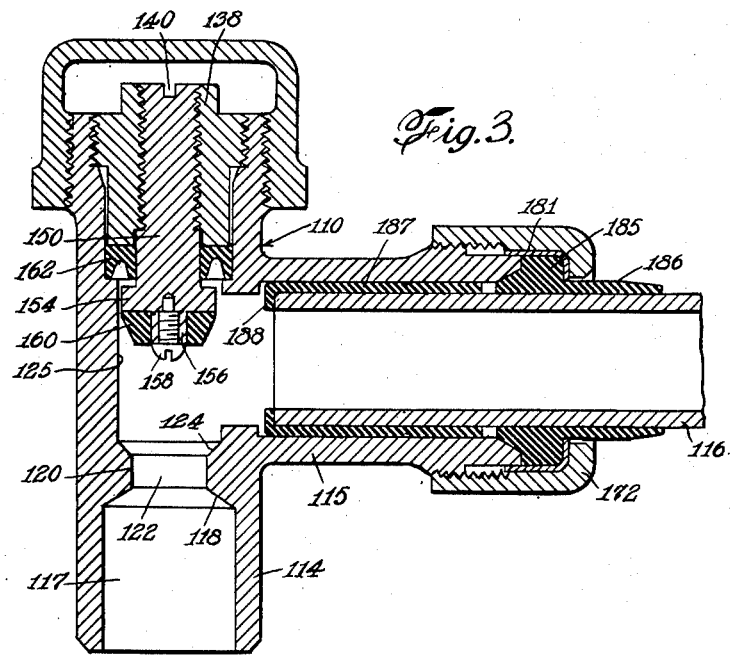
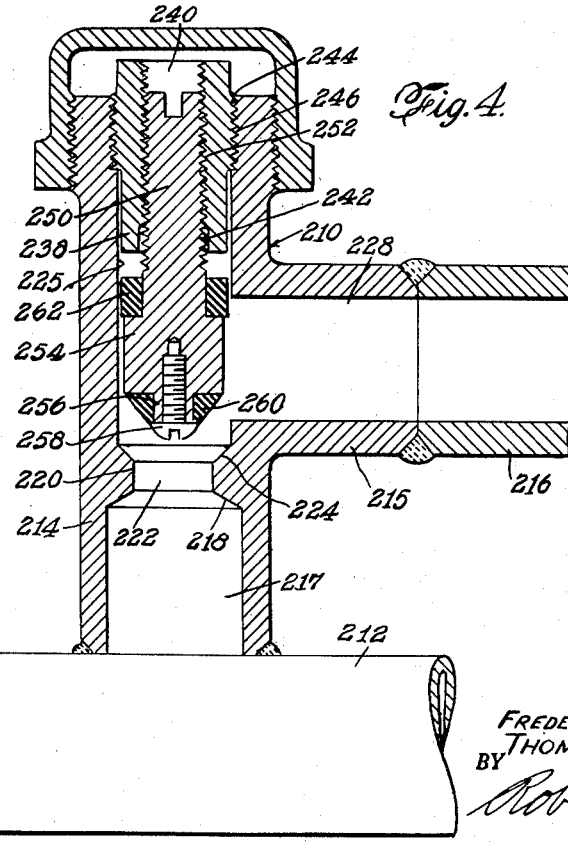
INVENTORS
FREDERICK T. NEWELL AND
THOMAS J. O'HARGAN
BY
ATTORNEY March 12, 1957 F. T. NEWELL ET AL 2,784,933
SERVICE T
Filed July 27, 1951 3 Sheets-Sheet 3
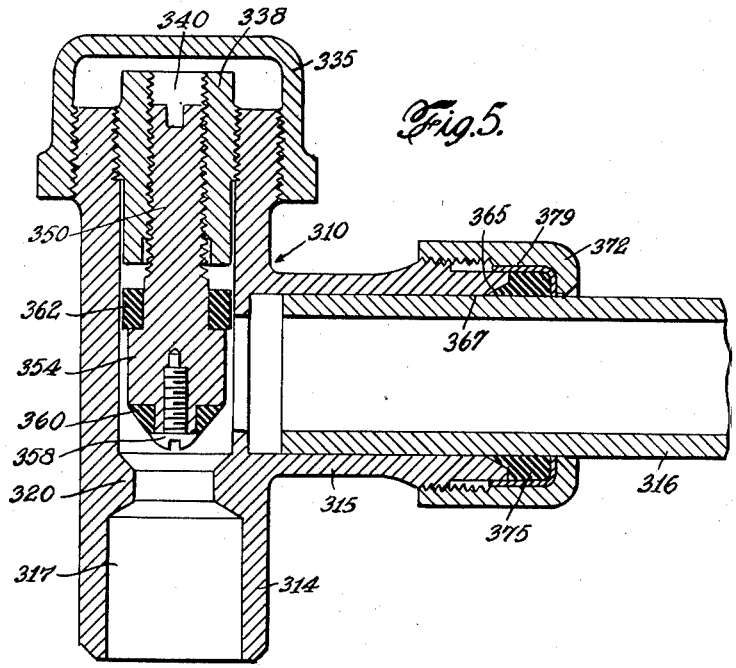
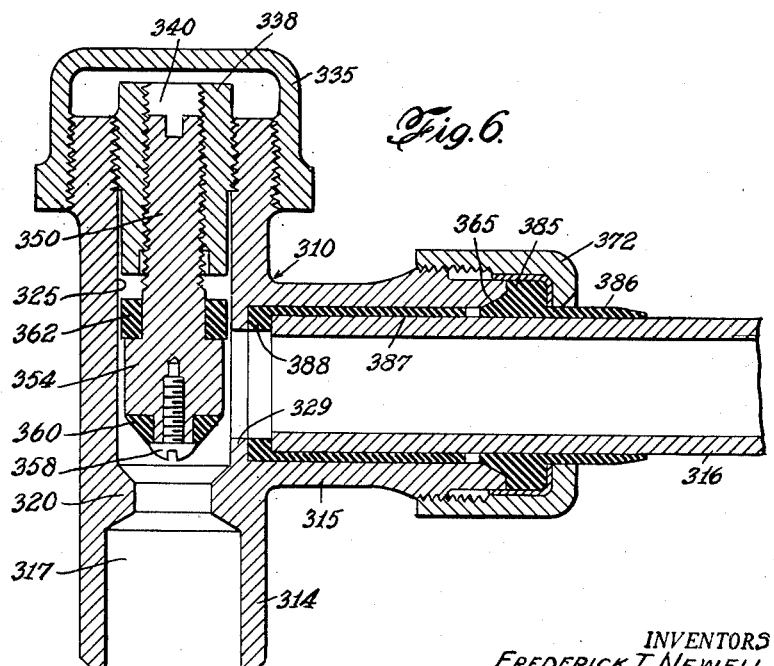
INVENTORS
FREDERICK T. NEWELL AND
THOMAS J. O'HARGAN
BY
Robert E. Burns
ATTORNEY United States Patent Office 2,784,933
Patented Mar. 12, 1957

2,784,933

SERVICE T

Frederick Thomas Newell and Thomas J. O'Hargan, Bradford, Pa., assignors to Dresser Industries, Inc., a corporation of Delaware Application July 27, 1951, Serial No. 238,898

8 Claims. (Cl. 251—225)

This invention relates to a service T and is more particularly concerned with a service T having improved integral valve means.

A service T is a fitting adapted to be interposed between a fluid pressure main and a branch line for conducting the fluid carried in the main, e. g. gas, water, oil, and the like into the branch line. In service T's of the type with which the present invention is concerned, the T is welded to the portion of the main to which it is desired to connect the branch line. An aperture is then drilled in the main by means of a drilling tool inserted through the service T to provide means for the passage of the fluid into the T. It is generally desirable to provide valve means for controlling the flow of fluid through the T into the branch line, thus, providing a combined T and valve. The valve structure must, however, be of a type which permits the insertion of the drilling tool when the service T is installed and the closing off of the entrance passage for the tool after the drilling operation has been completed. Various service T's having integral valve means have been heretofore proposed but have not been altogether satisfactory either because they have been complicated in structure and thus expensive to manufacture or because they have shown deficiencies in operation.

One source of difficulty in prior constructions has been the sealing of the valve against escape of the fluid passing through the line when the valve is open. Various types of seals have been proposed but they have not been wholly satisfactory for all purposes. Effective seating of the valve to provide a fluid-tight closure of the T has also presented a problem which has been attacked in various ways. Valves have been proposed, for example, which have required precision grinding of metal to provide precise metal to metal contact but obviously such structures are relatively expensive.

Furthermore, the heretofore proposed service T's have been adapted to be connected to the branch line by welding or by direct threaded engagement. While such service T's are suitable for certain applications they are of limited utility. They effect a rigid, substantially permanent connection between the existing line, and the branch line and since the branch line is to be welded or threadedly connected to the T the branch line must be of the exact type and size for which the service T is made. For example, a T which is suitable for connection to steel pipe would not be suitable for connection to copper tubing and a T which is adapted to connect a threaded branch line would be unsuitable for an unthreaded line. It is thus necessary to provide a separate service T not only for each size of pipe but for each type. This necessitates the manufacture and maintenance of stocks of a large variety of service T's, complicates the work of the pipe fitter and adds to the expense of this type of installation. Furthermore, it is frequently desirable to effect a relative flexible and resilient connection with the existing line, particularly in industrial installations where the vibration of machinery and thermal expansion of the branch line must be taken into consideration. Service T's to which the branch line is welded or threaded do not provide the desired flexibility.

In many cases, it is desirable to provide an insulating connection between the main and the branch line to prevent the flow of electrical current through the connected lines. A metal pipe laid underground tends to pick up electric current arising, for example, from industrial power grounds, the ground return of electric railway systems, etc. Furthermore, the electrical equipment in a building is customarily grounded by being connected to the piping ssytem. Conventional service T's to which the branch line is welded or threaded do not provide an insulated connection between the branch line and the main, but rather an electrical conducting connection permitting free flow of electric current from the main between the main and the branch line.

It is the principal object of the present invention to provide an improved service T which avoids the shortcomings and deficiencies of the service T's heretofore proposed.

It is another object of the invention to provide a service T of the character indicated having an improved integral valve means.

It is a further object of the invention to provide an improved service T for universal application.

It is another object of the invention to provide a service T which is adapted to receive both threaded and unthreaded pipe or tubing.

It is a still further object of the invention to provide a service T of the character indicated which will effect a flexible connection with a branch line and will permit vibration and thermal expansion of the branch line without damage to the line or to the service T.

Other objects and features of the invention will be readily apparent from the following detailed description and from the accompanying drawings in which, Fig. 1 is a sectional view of a service T embodying features of the present invention;

Fig. 3 is a similar view of the service T shown in Fig. 2 but provided with a modified branch gasket construction;

Fig. 4 is a sectional view of another embodiment of the service T of the invention;

Fig. 5 is a sectional view of a modified form of the service T shown in Fig. 3; and Fig. 6 is a similar view of this service T embodiment provided with a modified branch gasket arrangement.

Figure 1:
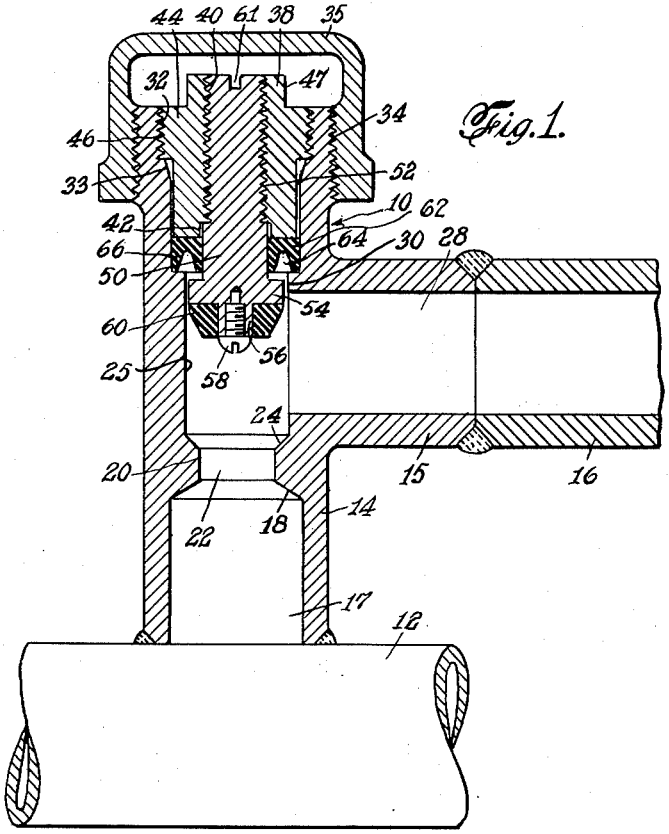

Referring to the drawings, and more particularly to Fig. 1, the reference numeral 10 designates generally a service T installed upon a main line pipe 12. The service T 10 comprises a body portion 14 having a branch portion 15 which is adapted to be connected to the branch line pipe 16. The lower end of the body portion 14 is bored to provide a cylindrical aperture 17 which tapers inwardly along a frusto-conical surface 18 defined by an annular rib 20 which forms a cylindrical throat 22 of lesser diameter than the aperture 17. The upper surface of the rib 20 tapers outwardly to define a frusto-conical valve seat 24 at the lower end of the main bore 25 of the T 10 which communicates directly with the bore 28 of the branch portion 15. Above the branch bore 28, the main bore 25 is of increased diameter and forms an annular shoulder 30. The upper end of the T 10 is formed with an internally threaded bore 32 of somewhat greater diameter than the bore 25 but communicating directly with it along an inwardly tapering surface 33. The upper end of the T 10 is also provided with external threads 34 which are threadedly engaged by a cap 35 when the valve is to be closed off.

Positioned in the upper portion of the T 10 above the branch portion 15 is a bushing 38 having a threaded axial bore 40 extending throughout its length. The lower end of the bore 40 has a slightly enlarged non-threaded portion 42. Externally, the bushing 38 is formed with an outwardly-extending annular rib 44 which is provided with threads 46 along its periphery engageable with and of the same pitch as the threads of the bore 32. The upper end of the bushing above the threaded rib 44 is formed as a wrench portion 47 for receiving a wrench or like tool for use in opening and closing the valve, as will be described hereinafter. The valve structure is completed by a valve stem carrying a valve head portion to which is attached a suitable washer for fluid-tight engagement with the frusto-conical valve seat 24. Thus, referring to Fig. 1, a valve stem 50 having external threads 52 engageable with the threaded bore 40 of the bushing 38, has a lower head portion 54 of slightly greater diameter. The diameter of the head portion 54 is such that it slides within the cylindrical opening defined by the shoulder 30. The head portion 54 also has a downwardly extending relatively thin extension 56 which is threadedly-bored to receive a screw 58 for holding a washer 60 in place on the valve head. The upper end of the stem 50 is formed with a radial slot or kerf 61 for reception of a screwdriver or like tool.

Sealing of the valve against escape of fluid, when the valve is open and communication between main line pipe 12 and branch line pipe 15 is established, is effected by a self-sealing gasket 62. The gasket 62 has an axially-extending annular groove 64 which divides the lower half of the gasket 62 into two flexible lips 66 which bear against the side of the bore 25 above the shoulder 30 and against the outer surface of the valve stem 50. When the valve is open, the pressure of the fluid flowing through the T presses the lips 66 against the adjacent surfaces and provides a self-sealing action which prevents the flow of fluid out through the valve stem.

The gasket 62 is formed from rubber or rubber composition, this term being used generically to include natural and synthetic rubber and elastomeric compounds, or compositions having like properties and characteristics. The material is relatively firm but sufficiently resilient and elastic to be deflected and compressed by the fluid in the T. Thus, for example, the gasket 62 is advantageously formed from natural rubber, polyethylene and like compositions. Preferably, the gasket 62 is formed from a rubbery composition of the character indicated which is relatively resistant to attack by hydrocarbon gases and oils. Examples of such resistant rubbery compositions suitable for use in our service welding T are neoprene (polychloroprene) and butadiene-acrylonitrile copolymers, such as those known commercially by the trade designations Buna-N or GR-A. Our invention is not limited to these specific materials, and particularly when special resistance to gases and oils is not required, any rubbery composition having the above-noted characteristics may be employed.

Figure 2:
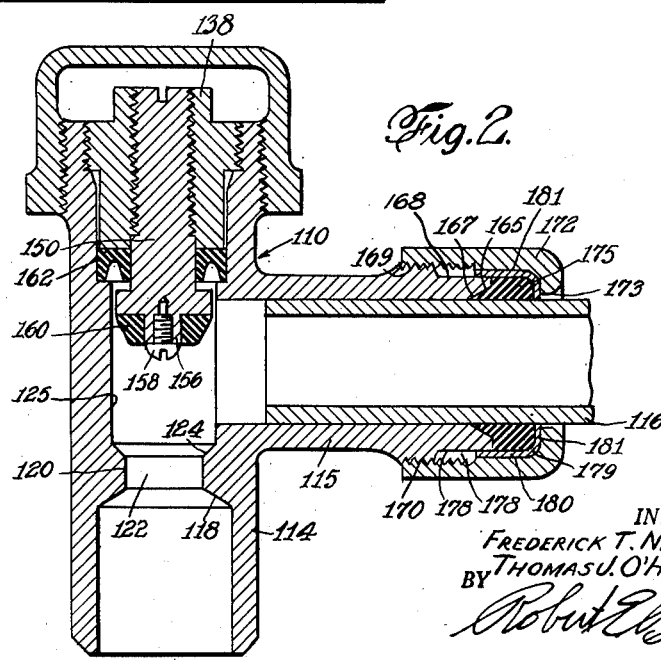
Fig. 2 is a sectional view of the service T shown in Fig. 1 but having a modified form of branch connection.

In the embodiment shown in Fig. 1, the branch portion 15 is constructed for a weld connection to the branch line 16. Preferably, however, our service welding T is provided with a branch structure which permits a flexible connection to the branch line to be made without particular reference to the material of which the branch line is formed or to its exact size. That is to say, we advantageously provide a structure which permits the T to be connected to a threaded or unthreaded branch line made of any material, e. g. cast iron, brass, copper, and the like. Referring to Fig. 2, wherein parts corresponding to those shown in Fig. 1 have been given the same reference numerals with 100 added thereto, there is shown a service T 110 having a body portion 114 substantially identical with the body portion 14 of service T 10 and provided with a bushing 138, a valve stem 150 and self-sealing gasket 162. The service T 110 differs from T 10, however, in the construction of the branch portion. As shown in Fig. 2, the branch portion 115 has an outer end shaped to define a gasket recess 165, the wall of which tapers inwardly to the pipe aperture 167. The outer surface of the branch portion 115 has a cylindrical portion 168 extending from the outer edge of the branch portion to an annular portion 169 of greater diameter, the outer face of the annular portion 169 being provided with screw threads 170. These threads are adapted to be engaged by the internal threads of an annular follower nut 172 having an aperture 173 for receiving the branch pipe or tubing 116. A gasket 175 is accommodated in the annular space between the outer surface of pipe or tubing 117, gasket recess 165 and follower nut 172. While the gasket may be of various forms, we have found particularly suitable one which is wedge shape or of substantially triangular cross-section. The gasket 175, like the self-sealing gaskets 62 and 162 is formed from rubber or rubber composition. The gasket 175 is formed from a material which is relatively firm and solid but sufficiently resilient and elastic to flow under pressure to conform to the surfaces between which it is confined.

The follower nut 172 is so formed that its internal cylindrical face is of greater diameter than the cylindrical portion 168 of branch portion 115, thus forming a thin annular recess 178. A cup-shaped metal follower 179 having an inwardly-directed body portion 180 and an axial flange 181 surrounds the outer end of the gasket 175 and fits loosely within follower nut 172 so that in tightening the nut upon the end of branch 115, the follower is held stationary by its frictional engagement with the gasket and the nut turns with respect to the follower with the result that there is no frictional contact between the nut 172 and the gasket 175. The flange 181 of the follower fits over the cylindrical portion 168 and is accommodated within the recess 178. The follower 179 is dimensioned so that substantially complete compression of the gasket 175 is effected before the leading edge of the flange 181 will engage annular portion 169. The pipe receiving aperture 167 and the aperture 173 of follower nut 172 are of substantially the same diameter and are formed in sizes to fit any of the standard sizes of pipe. It will be apparent, however, that by reason of the gasket 175 which is capable of substantially inward radial movement upon compression, that a given aperture size will accommodate considerable variance in the outside diameter of the pipe and there is no need for the pipe or tubing to be received by the branch 115 to be of the exact size of apertures 167 and 173. Furthermore, it will be observed that there is no threaded engagement with the branch line. It will be apparent that our service welding T will accommodate threaded or unthreaded pipe, tubing and the like and is thus of universal application.

It is frequently desirable to provide an insulating joint to prevent the flow of electrical current through the pipe line. A metal pipe laid underground, as previously mentioned, tends to pick up electric current arising from industrial power grounds, the ground return of electric railway systems, etc. In accordance with our invention, we provide an insulating service welding T by employing a T of the type hereinabove described with a modified form of gasket. Instead of using the above-described gasket 175, we employ a gasket constructed in accordance with the embodiment shown in Fig. 3. Thus, as shown, the branch portion 115 of the service welding T 110 is provided with a gasket comprising a main body portion 185, an outwardly-extending sleeve portion or apron 186 and an inwardly-extending sleeve portion or apron 187 having an inwardly-turned integral flange portion 188 at its free end.

It will be observed that the sleeve portion 187 extends from the body portion 185 of the gasket to the end of the pipe and the flange 188 insures against accidental contact between the end of branch pipe 116 and the wall of the branch portion 115. Similarly, the apron 186 extends from the body portion 185 of the gasket outwardly well beyond follower nut 172. Metal-to-metal contact is thus effectively prevented and current cannot pass along the line. The rubber or rubber composition from which the gasket is formed is, of course, non-conducting. Advantageously, we form the gasket as an integral unit, but the apron 186 or the apron 187, or both, may be formed separately and pressed into sealing engagement with the main body portion 185 when the branch line pipe is connected. As shown in Fig. 3, the apron 187 is formed separately while the body portion 185 and the outwardly-extending apron 186 are formed integrally. The body portion 185 and the aprons may be formed from the same rubbery material or, when a non-integral construction is used they may be formed from different materials. In the T shown in Fig. 3, for example, the gasket body and the integral apron 186 may be formed from natural rubber, while the apron 187 may be formed from polyethylene. In the embodiment shown in Fig. 3, the pipe aperture in the follower nut 172 must be sufficiently large to accommodate both the pipe 116 and the apron 186. The pipe aperture in the branch portion 115 must similarly, of course, also be of sufficient diameter to receive both the pipe 116 and the sleeve or apron 187.

In the embodiments of our invention shown in Figs. 1, 2 and 3, the body of the service welding T and the valve structure have been the same. It will be apparent, however, that various changes and modifications of these portions of our fitting may be made without departing from the spirit and scope of our invention. One modified form is shown, for example, in Fig. 4, wherein parts corresponding to those shown in Fig. 1 have been given the same reference numerals with 200 added thereto. As shown in Fig. 4, the service welding T 210 illustrated has a body portion 214 and a branch portion 215 adapted to be welded to the main line pipe 212 and the branch line pipe 216, respectively. The lower end of the body portion 214 is bored to provide a cylindrical aperture 217 which tapers inwardly along a frusto-conical surface 218 defined by an annular rib 220 which forms a cylindrical throat 222 of lesser diameter than the aperture 217. The upper surface of the rib 220 tapers outwardly to define a frusto-conical valve seat 224 at the lower end of the main bore 225 of the T 210 which communicates directly with the bore 228 of the branch portion 215. The main bore 225 extends upwardly through body portion 214 with a substantially uniform diameter and is provided with threads extending inwardly a short distance from the upper end of the T.

Disposed in the upper portion of T 210 above the branch portion 215 is a bushing 238 having a threaded axial bore 240 extending throughout its length. The lower end of the bore 240, like the bore 40 of the T shown in Fig. 1, has a slightly enlarged non-threaded portion 242. Externally the bushing 238 is formed with a threaded rib 244 having threads 246 engageable with the threads of the bore 225. Threadedly engageable with the threaded bore 240 is the valve stem 250 which has external threads 252. The stem 250 has a lower head portion 254 of slightly greater diameter and the head portion has a downwardly-extending extension 256 which is threadedly-bored to receive a screw 258 for holding a washer 260 in place.

Seated on the upper rim of the head portion 254 around the stem 250 is an annular gasket 262 adapted to seal the stem when the valve is open. The gasket 262, like gasket 62, is formed from rubber or a rubbery composition. The rubbery composition forming gasket 262 is relatively firm and solid but sufficiently resilient and elastic to flow under pressure to conform to the surfaces between which it is confined. Gasket 262 is not of the self-sealing type and requires compression between the head portion 254 and the lower end of bushing 238 when the valve is opened.

To apply and install our service welding T, the lower end of the body portion of the T is welded to the main line pipe as shown in Figs. 1 and 4 by gas welding or other convenient means. The branch line pipe is then connected to the branch portion of the T. In the embodiment shown in Fig. 1, the branch line pipe 16 is welded to the branch portion 15. In the embodiments shown in Figs. 2 and 3, the branch line pipe 116 is merely stabbed into the branch 115 and the follower nut 172 tightened until the gasket is sufficiently compressed to provide the desired fluid-tight, flexible connection.

The valve assembly, i. e. the valve stem and the bushing are then removed from the T and a drilling tool of any convenient known type is inserted through the main bore of the T and an aperture in the main line pipe is drilled. The drilling tool is then removed and the valve assembly replaced. If, in the embodiment shown in Fig. 1, for example, the valve is to be closed, the valve stem 50 is screwed downwardly by means of a screw-driver inserted in the kerf 61 until the washer 60 engages the valve seat 24. Although effective seating of the washer 60 may be achieved merely by turning the valve stem 50 as mentioned, a firmer seating, as when high pressure fluids are being transmitted through the line, may be effected by backing the bushing 38 out of the T to a slight extent by means of a wrench or other tool in engagement with wrench portion 47 and then screwing both the stem 50 and the bushing 38 simultaneously inwardly. When the valve is to be opened to permit the flow of fluid from the main line into the branch line, the valve stem 50 is merely screwed outwardly until the position shown in Fig. 1 is reached. The self-sealing gasket 68 effectively prevents leakage around the valve stem. When the valve is to be left either open or closed for any period of time the cap 35 is advantageously screwed into position on the upper end of body portion 14 to discourage tampering and keep the valve assembly clean.

The service welding T shown in Fig. 4 is installed in substantially the manner above-described. When, however, the valve is opened, it is necessary to raise the valve stem 250 to a sufficient extent that the gasket 262 is compressed into sealing engagement, since this gasket is not of the self-sealing type. This is done merely by screwing the stem 250 upwardly as far as it will readily come. The top surface of the valve head portion 254 compresses the gasket against the lower surface of the bushing 238 and the gasket is expanded radially into sealing engagement with the surface of the stem and the wall of the bore 225 in which the bushing and valve stem are positioned.

The valve assembly shown in Fig. 4 may also be employed in a T construction having a branch for non-rigid and insulating connection with the branch line pipe. Thus, as shown in Fig. 5, there is shown a service welding T having the body and valve construction of the T shown in Fig. 4 but having a branch structure suitable for connection to a threaded or unthreaded branch pipe or tubing. In Fig. 5, wherein parts corresponding to those shown in Fig. 2 have been given the same reference numerals with 200 added thereto, there is shown a service T 310 having a branch 315 having an outer end shaped to define a gasket recess 365, the wall of which tapers inwardly to the pipe aperture 367. Like the embodiment shown in Fig. 2, the T 310 has a gasket 375 seated in the gasket recess 365, follower 379, and follower nut 372 for compressing the gasket into sealing engagement around the branch line pipe 316.

Similarly, if an electrically insulating construction is desired, a gasket and gasket apron structure of the type shown in Fig. 3 may be provided. Thus, as shown in Fig. 6, the branch 315 of T 310 has a gasket formed from a main body portion 385, an outwardly-extending sleeve portion or apron 386 and an inwardly-extending apron 387 having an inwardly-turned integral flange portion 388 which overlies the inner end of the branch line pipe 316 and when the pipe is fully inserted, as shown, engages the rib 329.

Instead of being adapted for welding or flexible compression connection to the branch line as in the above-described embodiments, the branch of our T may, if desired, be constructed with internal or external threads for threaded engagement with the branch line. Similarly, the lower end of the main body portion may be formed for threaded engagement with the main line pipe.

While, therefore, we have thus described and illustrated our invention in terms of preferred illustrative embodiments thereof, it will be apparent to those skilled in the art that various changes and modifications may be made in the embodiments illustrated without departing from the scope of the invention as defined in the appended claims, and it is intended, therefore, that all matter contained in the foregoing description and in the drawings shall be interpreted as illustrative and not in a limiting sense.

What we claim and desire to secure by Letters Patent is:

1. A valved welding T adapted to form a fluid conductive connection between a main line pipe and a branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem, and resilient, elastic and flexible annular sealing means encircling said valve stem below the lower end of said bushing, the portion of said valve stem engaged by the sealing means when the valve is in fully open position being free from threads, said sealing means extending across the interior of said body portion in a position to provide simultaneously a seal between said valve stem and said bushing and between said bushing and said body portion, and said stem being provided with an annular shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, and said stem carrying said washer sufficiently above said seat when said stem is in fully open position to permit full flow through said throat portion.

2. A valved welding T adapted to form a fluid conductive connection between a main line pipe and a branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem, and resilient, flexible sealing means encircling said valve stem below the lower end of said bushing, said sealing means comprising a resilient and elastic, flexible annular body, the portion of said valve stem engaged by the sealing means when the valve is in fully open position being free from threads, said sealing means extending across the interior of said body portion in position to provide simultaneously a seal between said valve stem and said bushing and between said bushing and said body portion, and said stem being provided with an annular shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, and said stem carrying said washer sufficiently above said seat when said stem is in fully open position to permit full flow through said throat portion.

3. A valved welding T adapted to form a fluid conductive connection between a main line pipe and a branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower enlarged head portion provided at its end with a washer of greater diameter than said stem engageable with the valve seat formed by said radial rib upon downward rotational movement of said valve stem, said bushing and said valve stem being rotatable both separately and simultaneously for axial displacement of said stem, and resilient, flexible sealing means encircling said valve stem below the lower end of said bushing, said sealing means comprising a resilient and elastic, flexible annular body, the portion of said valve stem engaged by the sealing means when the valve is in fully open position being free from threads, said sealing means extending across the interior of said body portion in position to provide simultaneously a seal between said valve stem and said bushing and between said bushing and said body portion, and said stem being provided with an annular shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, said stem carrying said washer sufficiently above said seat when said stem is in fully open position to permit full flow through said throat portion.

4. A valved welding T adapted to form a fluid conductive connection between a main line pipe and a branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem, and resilient, flexible sealing means encircling said valve stem below the lower end of said bushing, said sealing means comprising a resilient and elastic annular body having an axial groove extending inwardly from the inner surface thereof to define two flexible annular lips, the portion of said valve stem engaged by the sealing means when the valve is in fully open position being free from threads, said sealing means extending across the interior of said body portion to provide simultaneously a seal between said valve stem and said bushing and between said bushing and said body portion, and to close simultaneously the space between said sleeve and said wall and the space between said stem and said sleeve, said stem carrying said washer sufficiently above said seat when said stem is in fully open position to permit full flow through said throat portion.

5. A valved welding T adapted to form a fluid conductive connection between a main line pipe and a branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem and the threads on said valve stem on said bushing and in the upper portion of said body portion having the same pitch, and resilient, flexible and elastic annular sealing means encircling said valve stem below the lower end of said bushing, the portion of said valve stem engaged by the sealing means when the valve is in fully open position being free from threads, said sealing means extending across the interior of said body portion in position to provide simultaneously a seal between said valve stem and said bushing and between said bushing and said body portion, and said stem being provided with an annular shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, and said stem carrying said washer sufficiently above said seat when said stem is in fully open position to permit full flow through said throat portion.

6. A valved welding T adapted to form a fluid conductive connection between a main line pipe and a branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem and the threads on said valve stem on said bushing and in the upper portion of said body portion having the same pitch, and resilient, elastic and flexible sealing means encircling said valve stem below the lower end of said bushing, said sealing means comprising a resilient, flexible annular body, the portion of said valve stem engaged by the sealing means when the valve is in fully open position being free from threads, said sealing means extending across the interior of said body portion in position to provide simultaneously a seal between said valve stem and said bushing and between said bushing and said body portion, and said stem being provided with an annular shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, said stem carrying said washer sufficiently above said seat when said stem is in fully open position to permit full flow through said throat portion.

7. In a pipe line including a main line and a branch line, a valved T forming a fluid conductive connection between said main line pipe and said branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem, and resilient, flexible and elastic annular sealing means disposed around said valve stem below the lower end of said bushing, the portion of said valve stem engaged by the sealing means when the valve is in fully open position being free from threads, said sealing means extending across the interior of said body portion in position to provide simultaneously a seal between said valve stem and said bushing and between said bushing and said body portion, and said stem being provided with an annular shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, and said stem carrying said washer sufficiently above said seat when said stem is in fully open position to permit full flow through said throat portion.

8. In a pipe line including a main line and a branch line, a valved welding T adapted to form a fluid conductive connection between said main line pipe and said branch line pipe, said T being resistant to escape of high pressure fluids therefrom when full flow of fluid through the T occurs and comprising, in combination, a tubular body portion adapted to be connected at its lower end to the main line pipe, and a branch portion communicating interiorly with the body portion adapted to be connected to the branch line pipe, the upper portion of said body portion being internally threaded and said body portion having an inwardly extending radial rib defining a valve seat below and spaced from said branch portion, said valve seat tapering downwardly to a throat portion of lesser diameter than the interior diameter of the upper portion of said body portion, a cylindrical bushing having external threads engageable with the internally-threaded upper body portion and having a threaded axial bore, a cylindrical valve stem threadedly engageable with the said axial bore and having a lower portion provided at its end with a washer engageable with the valve seat formed by said radial rib upon downward rotational movement of said valve stem, said bushing and said valve stem being rotatable both separately and simultaneously for axial displacement of said stem and the threads on said valve stem on said bushing and in the upper portion of said body portion having the same pitch, and resilient, flexible sealing means encircling said valve stem below the lower end of said bushing, said sealing means comprising a resilient, elastic and flexible annular body, the portion of said valve stem engaged by the sealing means when the valve is in fully open position being free from threads, said sealing means extending across the interior of said body portion in position to provide simultaneously a seal between said valve stem and said bushing and between said bushing and said body portion, and said stem being provided with a shoulder at its lower end for direct engagement with said sealing means to compress said sealing means against the lower end of said bushing and thereby to expand said sealing means radially into engagement with the wall of the tubular body portion to close simultaneously the space between said sleeve and said wall and the space between said stem and said sleeve when said valve stem is raised into fully open position, and said stem carrying said washer sufficiently above said seat when said stem is in fully open position to permit full flow through said throat portion.

References Cited in the file of this patent

UNITED STATES PATENTS

| | | | |
|---|---|---|---|
| Re. 17,022 | Wilson | July 3, | 1928 |
| 96,394 | Clark | Nov. 2, | 1869 |
| 147,060 | Malmstrom et al. | Feb. 3, | 1874 |
| 222,217 | Watson | Dec. 2, | 1874 |
| 212,875 | Walworth | Mar. 4, | 1879 |
| 558,034 | Brown | Apr. 14, | 1896 |
| 1,172,298 | Morris | Feb. 22, | 1916 |
| 1,268,511 | String | June 4, | 1918 |
| 2,269,695 | Scharf | Jan. 13, | 1942 |
| 2,321,597 | Hobbs | Jan. 15, | 1943 |
| 2,336,173 | Henderson | Dec. 7, | 1943 |
| 2,447,510 | Langdon | Aug. 24, | 1948 |
| 2,608,201 | Henry | Aug. 26, | 1952 |

FOREIGN PATENTS

| | | |
|---|---|---|
| 13,484 | Great Britain | of 1902 |
| 344,172 | Great Britain | of 1930 |
| 734,651 | France | of 1932 |